Jan. 22, 1963 M. L. ABEL 3,074,768
BEARING
Filed Aug. 17, 1959 2 Sheets-Sheet 1
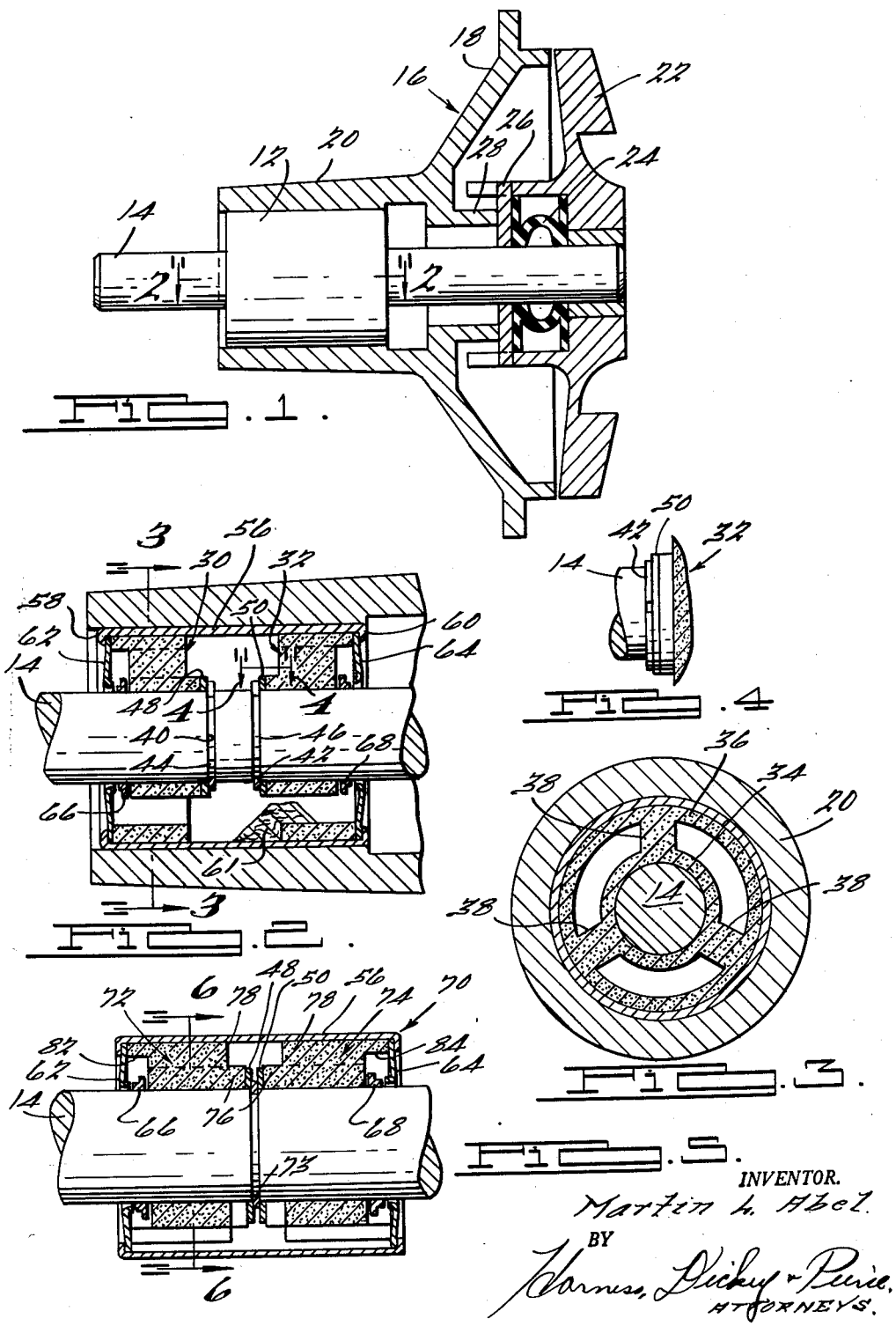
INVENTOR.
Martin L. Abel

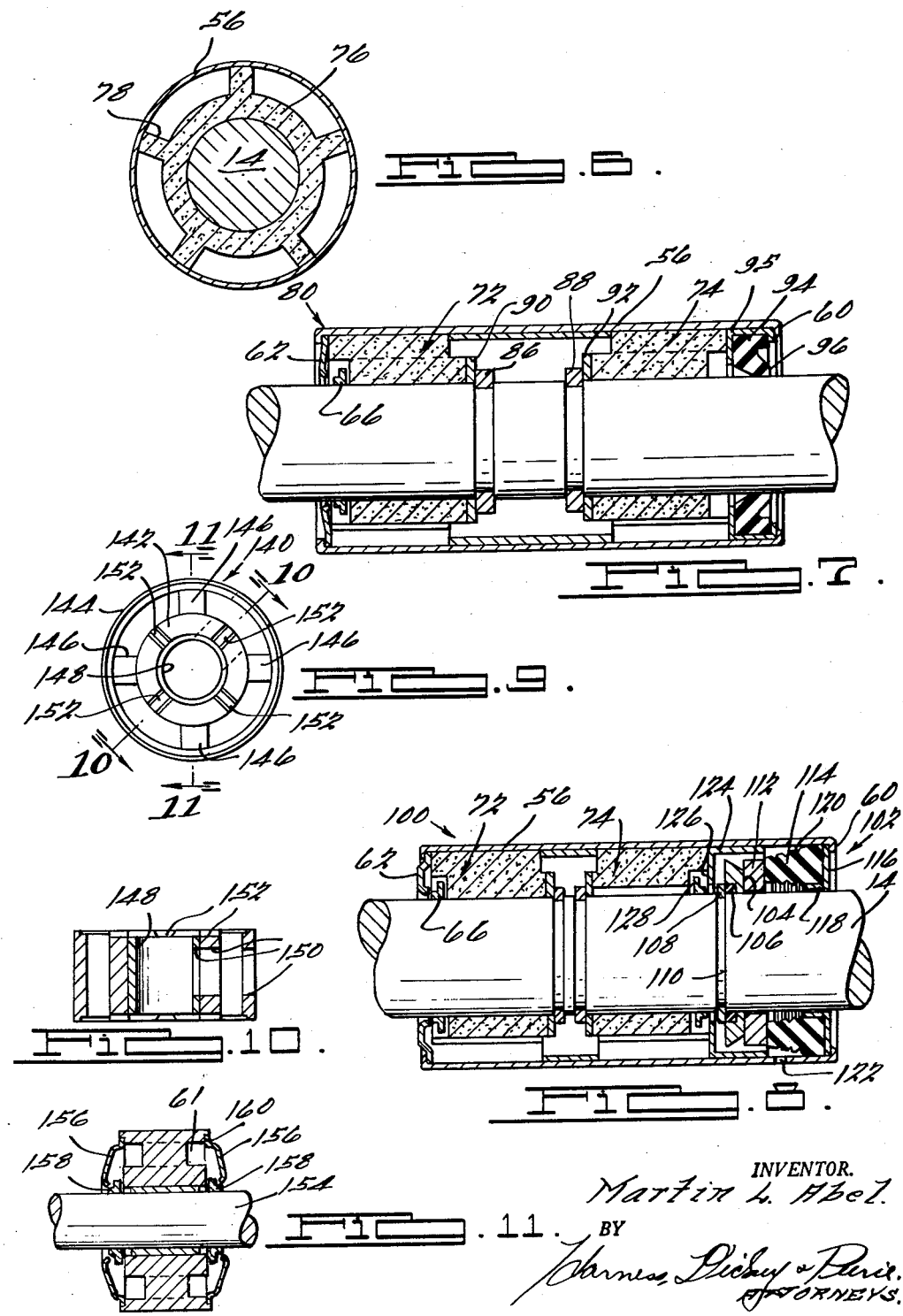

United States Patent Office 3,074,768
Patented Jan. 22, 1963

3,074,768
BEARING
Martin L. Abel, Oak Park, Mich., assignor to Tann Corporation, Detroit, Mich., a corporation of Michigan
Filed Aug. 17, 1959, Ser. No. 834,152
9 Claims. (Cl. 308—121)

This invention relates to bearings and particularly to a self-lubricating bearing for rotatably supporting a pump shaft.

It is one object of the invention to provide a bearing having a cylindrical sheet metal housing with a pair of axially spaced bearing elements secured therein to rotatably support a shaft and cooperate with the housing to define a reservoir for a lubricated wicking material to continuously supply a lubricant to the surface of the shaft.

It is another object of the invention to provide a bearing of the type described above having a seal assembly secured within one end of the cylindrical housing to prevent foreign matter from passing along the shaft and into the bearing.

It is a further object of the invention to provide a sintered bearing element for rotatably supporting a shaft in a bore substantially larger than the shaft in a manner to provide a reservoir for retaining a lubricated wicking material.

It is a still further object of the invention to provide a sintered bearing element having an inner sleeve with radially extending spider arms for supporting the inner sleeve within a bore in position to rotatably support a shaft of smaller diameter than the bore, the spider arms defining a reservoir therebetween for retaining lubricating wicking material.

It is a still further object of the invention to provide a bearing element having an inner sleeve portion and radially projecting spider arms for supporting the inner sleeve portion in a bore and defining a reservoir therebetween for retaining a lubricating wicking material, the inner sleeve portion being provided with an aperture for transmitting the lubricant to the surface of a shaft rotatably supported within the inner sleeve.

It is a further object of the invention to provide a fabricated bearing which is simple and economical to manufacture, self-lubricating, efficient in operation and rugged in construction.

Other objects and features of novelty of the invention will be specifically pointed out or otherwise become apparent when referring, for a better understanding of the invention, to the following description taken in conjunction with the accompanying drawings wherein:

FIGURE 1 is a sectional view of a pump having a bearing embodying features of the present invention rotatably supporting the shaft thereof;

FIG. 2 is an enlarged sectional view of the structure illustrated in FIG. 1, taken along the line 2—2 thereof;

FIG. 3 is a sectional view of the structure illustrated in FIG. 2, taken along the line 3—3 thereof;

FIG. 4 is a sectional view of the structure illustrated in FIG. 2, taken along the line 4—4 thereof;

FIG. 5 is a sectional view similar to that of FIG. 2, illustrating another form of the invention;

FIG. 6 is a sectional view of the structure illustrated in FIG. 5, taken along the line 6—6 thereof;

FIG. 7 is a sectional view similar to that of FIG. 5 illustrating still another form of the invention;

FIG. 8 is a sectional view similar to that of FIG. 7 illustrating still another form of the present invention;

FIG. 9 is an end view of a bearing element embodying features of the present invention;

FIG. 10 is a sectional view of the bearing element of FIG. 9, taken along the line 10—10 thereof; and FIG. 11 is a sectional view of the bearing illustrated in FIG. 9, taken along the line 10—10 thereof, mounted on a rotating shaft with oil slingers and end caps incorporated therewith.

Referring to FIG. 1, a bearing 12 embodying features of the present invention is illustrated rotatably supporting a pump shaft 14. The pump shaft 14 may be that of any suitable pump, but is herein illustrated as the pump shaft of conventional water pump 16 of the type commonly used in some automotive vehicles. The pump 16 briefly comprises a housing 18 having a hub portion 20 in which the bearing 12 is disposed, and a rotating element 22 which circulates the cooling water. The rotating element 22 is fixed to the right end of the pump shaft 14 and a suitable flexible seal 24 is provided for preventing the water being circulated from reaching the bearing 12. The seal 24 rotates with the rotating element 22 and a suitable thrust washer 26 is provided which rotates with the rotating element and bears against the end of an internal annular boss 28 to reduce the friction that would otherwise occur if the seal 24 were to bear directly against the right end of the boss 28. Since the water pump 16 is conventional, the manner in which it is enclosed and mounted on the engine has not been shown.

Referring to FIGS. 2–4, the bearing 12 illustrating one embodiment of the present invention is comprised of a pair of axially spaced porous, sintered metal bearing elements 30 and 32 which rotatably support the pump shaft 14. Each of the bearing elements 30 and 32 has an inner sleeve 34 and an outer sleeve 36 axially offset from one another and interconnected by integral spider arms 38. The bearing elements 30 and 32 are fixed against axial movement toward one another by snap rings 40 and 42 which fit within grooves 44 and 46, respectively, on the pump shaft 14. Thrust washers 48 and 50 are disposed between the snap rings and the bearing elements and are preferably fixed against rotation relative to the bearing elements 30 and 52. A cylindrical housing 56 made of sheet metal or any other suitable material is disposed over the sleeves 36 of each of the bearing elements, and the ends thereof are rolled over as at 58 and 60 to fix the bearing elements against axial movement away from one another. The cylindrical housing 56 can, of course, be press fit or otherwise suitably secured against rotation relative to the hub portion 20 of the water pump 16.

With this construction, a relatively long bearing is provided for rotatably supporting the pump shaft 14 in a rugged manner, and a large reservoir is also provided within the housing and between the spider arms 38 for retaining a suitable wicking material 61 impregnated with the lubricant. The porous sintered construction of the elements 30 and 32, of course, enables the lubricant carried by the wicking material to pass through the inner sleeves 34 to lubricate the surface of the rotating pump shaft 14. Suitable washer shaped end caps 62 and 64 are provided for enclosing each end of the housing 56 and are firmly retained against the ends of the sleeves 36 by the rolled over end portions 58 and 60 of the cylindrical housing 56. Suitable oil slingers 66 and 68 which are preferably made of nylon are secured directly to the rotating shaft 14 for rotation therewith adjacent the inner peripheries of the end caps 62 and 64, respectively, to sling lubricant that works its way along the shaft radially outwardly into the reservoir defined by the cylindrical housing 56 where it will again be absorbed by the lubricated wicking material 61 disposed within the housing. This prevents the escape of the lubricant and keeps it recirculating through the bearing.

The wicking material can be any suitable absorbent material that will hold large quantities of lubricant. Examples of such material would be small pieces of wool or other types of fibers, or a resin granulated material having a great affinity for a lubricant. Because of capillary attraction the interstices of the porous sintered inner sleeve will completely fill themselves with lubricant drawn from the wicking material 61, and the surface of the inner sleeve 34 produces a pumping effect with the surface of the shaft 14 when the latter is rotated to draw the lubricant from the interstices of the inner sleeve and pass it along the shaft to the ends of the bearings where it will be thrown off by the oil singers back into the wicking material 61 as previously described.

Referring to FIGS. 5 and 6, a bearing 70 is illustrated which is similar to the bearing 12 with the exception that the bearing elements 72 and 74 are more closely spaced together with a single split ring 73 disposed between the thrust washers 48 and 50. The cylindrical housing 56 can be reduced in length, or the sintered elements themselves can be increased in length as illustrated in FIG. 5. In the embodiment illustrated in FIGS. 5 and 6, the bearing elements 72 and 74 have also been redesigned to eliminate the outer sleeves 36. Each of the elements 72 and 74 merely comprises an inner sleeve 76 having a plurality of radially extending spider arms 78 directly engaging the cylindrical housing 56. Five spider arms are illustrated in FIG. 6, but the exact number can, of course, be varied. With this construction a pump shaft 14 of larger diameter can be more readily accommodated without decreasing the length of the spider arms. This is important because the length of the spider arms directly determines the amount of wicking material 61 that can be retained between the spider arms. As most clearly illustrated in FIG. 5, the spider arms 78 are offset outwardly relative to the inner sleeves 76 and the outer ends thereof are notched as at 82 and 84 to accommodate the oil slingers 66 and 68.

Referring to FIG. 7 another embodiment of the present invention is illustrated which is comprised of a bearing 80 having the bearing elements 72 and 74 spaced more widely apart and retained against axial movement by split rings 86 and 88 and thrust washers 90 and 92 which are similar to the split rings and thrust washers illustrated in FIG. 2. The cylindrical housing 56 is disposed about the bearing elements 72 and 74 and an oil slinger 66 and end cap 62 are provided adjacent the left end thereof in the manner previously described. A sealing ring 94 preferably made of a resin material and fixed within a cup-shaped retaining element 95 is held against the right end of the bearing element 74 by the rolled over end 60 of the cylindrical housing 56. The sealing ring 94 has an annular flexible lip 96 projecting radially inwardly from the inner periphery thereof and sealingly engaging the pump shaft 14. The sealing ring 94 is provided to prevent any water that may escape past the seal 24 illustrated in FIG. 1 from reaching the interior of the bearing 80. By angling the flexible lip 96 to the right as illustrated in FIG. 7, any water pressure that may build up on the right side of the seal 94 will exert a force on the lip 96 to increase its sealing engagement with the shaft 14 to ensure a water tight seal.

Referring to FIG. 8, a bearing 100 is illustrated which is similar to the bearing 80 previously described with the exception that a seal assembly 102 is disposed within the right end of the cylindrical housing 56 in place of the sealing ring 94. The sealing assembly 102 comprises a ring 104 preferably made of metal fixed to the pump shaft 14 for rotation therewith and an O-ring 106 disposed between the ring 104 and the pump shaft 14 to improve the seal therebetween. A split ring 108 is positioned within a groove 110 in the shaft 14 to prevent the movement of the ring 104 and O-ring 106 to the left. A second ring 112 preferably made of a softer bearing metal is disposed over the shaft 14 for rotation relative thereto and slidably engages the ring 104, the sliding bearing surfaces of the two rings being suitably finished to ensure that they will provide a seal therebetween as the ring 104 rotates relative to the ring 112, as will be described, to prevent water from the water pump from flowing therebetween and into the bearing 100. A compressible ring 114 having a washer 116 with an in-turned hub flange 118 on the right end thereof frictionally engages the right face of the ring 112 and is retained thereagainst by the rolled over right end 60 of the cylindrical housing 56. When assembled, the ring 114 is placed under compression so that it resiliently urges the ring 112 against the rotating ring 104.

The compressible ring 114 is preferably made of neoprene, or the like, and is provided with grooves 120 on the inner and outer periphery thereof to increase the compressibility thereof. If desired, the ring 114 may be bonded to the ring 112 to prevent rotation therebetween, although the inherent friction therebetween may be relied upon without bonding in most cases to prevent rotation therebetween. The ring 114 may also be suitably secured against rotation relative to the cylindrical housing 56 if desired. A suitable aperture 122 may also be provided in the bottom of the right end of the cylindrical housing 56 to provide a drain for any fluid that may accumulate in this portion of the bearing.

A cup-shaped element 124 is fixed within the cylindrical housing 56 with the radial flange 126 thereof abutting against the right end of the bearing element 74 to prevent axial movement thereof to the right and also to serve as a cap to retain lubricant within the bearing by cooperating with an oil slinger 128 in the same manner that the cap 62 on the left end of the bearing cooperates with the slinger 66 as previously described.

The bearing 100 of FIG. 8, provides an improved seal against the water, and since the seal assembly 102 is mounted entirely within the cylindrical housing 56, the bearing 100 may still be press fit in the hub portion 20 of the pump 16 as previously described. Further, by virtue of the construction of the seal assembly, even if the pump shaft 14 shifts slightly relative to the housing 56 during operation, the rotary seal will still be effective since the ring 114 resiliently maintains the ring 112 in sealing engagement with the ring 104.

FIGS. 9 and 10 illustrate a bearing element 140 embodying other features of the present invention. The bearing element 140 has an inner sleeve 142 and a concentric outer sleeve 144 interconnected by a plurality of spider arms 146. A bearing liner 148 of suitable bearing material, such as a babbit metal, is secured within the inner sleeve 142. The bearing liner and inner and outer sleeves are provided with aligned apertures 150, and each end face of the inner sleeve 142 is provided with a plurality of radially extending grooves 152.

With this construction the bearing element 140 can rotatably support a rotating shaft 154 as illustrated in FIG. 11, and suitable end caps 156 and oil slingers 158 can be incorporated therewith to recirculate the lubricant of the wicking material 61 which may be inserted between the spider arms 146 and the end caps 156. The oil slingers 158 are of course secured to the rotating shaft 154 for rotation therewith as previously described, and the end caps 156 may be press fit within a recess 160 formed on each end face of the outer sleeve 144, the inner periphery of each of the end caps overlapping the oil slingers 158 in the same manner in which the end caps 62 overlap the oil slingers 66 in FIGS. 2 and 5. With this construction the lubricant retained by the wicking material 61 will be drawn through the apertures 150 in the inner sleeve 142 and bearing liner 148 to lubricate the surface of the rotating shaft 154. As the lubricant finds its way along the shaft 154 due to the rotation thereof, it will be thrown radially outwardly by the oil slingers 158 and returned to the wicking material 61. In this manner the lubricant continually circulates through the wicking material 61 and apertures 150, along the rotating shaft 154 and then back into the wicking material.

The aperture 150 in the outer sleeve 144 is provided to facilitate the insertion of the lubricated wicking material 61 within the bearing element 140 and will of course be covered by the wall of the bore in which the bearing element 140 is to be inserted. A suitable plug or cover may also be provided, if desired, to close off the aperture 150 in the outer sleeve 144 after the wicking material has been inserted within the bearing element.

The bearing elements 140 may of course be used in place of the bearing elements 30 and 32 of FIG. 2 and since the bearing element 140 employs the apertures 150, the body thereof need not necessarily be made of porous, sintered metal because the lubricant will recirculate through the apertures 150 even though the body of the bearing 140 is made of metal that is impervious to the flow of lubricant therethrough.

While it will be apparent that the embodiments of the invention herein disclosed are well caculated to fulfill the objects of the invention, it will be appreciated that the invention is susceptible to modification, variation and change without departing from the proper scope or fair meaning of the subjoined claims.

What is claimed is:

1. A bearing for supporting a shaft comprising a pair of axially spaced coaxially aligned bearing elements, each of said bearing elements being adapted to support radial loads imposed thereon by the shaft, a housing extending over said bearing elements and cooperating therewith to define a main lubricant reservoir between the elements, secondary reservoir means in each of said bearing elements communicating with said main reservoir, said bearing elements being pervious to the flow of lubricant to transmit lubricant from said secondary reservoirs to the surface of the portion of the shaft supported thereby, means adjacent to at least one end of the bearing for recirculating lubricant that may pass along the shaft and out from beneath the bearing element adjacent thereto back into the secondary reservoirs of said bearing element, and seal means mounted within said one end of the housing outwardly of the recirculating means adjacent thereto to prevent foreign matter from passing along the shaft into the bearing.

2. The invention as defined in claim 1 wherein said seal means comprises a ring fixed within said one end of the housing and having a radially inwardly extending lip adapted to resiliently seal against the shaft.

3. A bearing and seal element comprising a cylindrical housing adapted to be mounted within an aperture in a supporting frame, a bearing element secured within said housing for rotatably supporting a shaft, seal means mounted entirely within one end of said housing for preventing foreign matter that may pass along the shaft from entering into said housing, means on said housing for preventing axial movement of said bearing element and seal means in a direction away from one another, said bearing element cooperating with said housing to define a lubricant reservoir and being adapted to transmit lubricant within said reservoir to the surface of the portion of the shaft to be supported thereby, and means positioned between said bearing element and seal means for recirculating lubricant that may pass along the shaft and out from beneath the bearing element back into said reservoir.

4. The invention as defined in claim 3 wherein said seal means comprises an axially compressible resilient ring fixed within said one end of the housing, a first bearing ring engaging the inner end of said resilient ring in a manner to prevent rotation therebetween, and a second bearing ring adapted to be fixed for rotation with said shaft and slidably engaging the exposed face of said first bearing ring to provide a rotary seal therebetween.

5. A bearing for supporting a shaft comprising a bearing element adapted to support radial loads imposed thereon by the shaft, a cylindrical housing supported on said bearing element and extending outwardly from one end thereof, seal means mounted within said one end of said housing to prevent foreign matter passing along the shaft toward said bearing element, reservoir means in said bearing element, said bearing element being pervious to the flow of lubricant from said reservoir means to the surface of the portion of the shaft supported thereby, and recirculating means positioned between said bearing element and seal means for recirculating lubricant that may pass along the shaft and out from beneath the bearing assembly back into said reservoir means.

6. A bearing for supporting a shaft comprising a pair of axially spaced co-axially aligned bearing elements, each of said bearing elements being adapted to support radial loads imposed thereon by the shaft, a housing extending over said bearing elements and cooperating therewith to define a main lubricant reservoir between the elements, a secondary reservoir in each of said bearing elements communicating with said main reservoir, said bearing elements being pervious to the flow of lubricant to transmit lubricant from said secondary reservoirs to the surface of the portion of the shaft supported thereby, one end of said housing extending beyond the bearing element adjacent thereto, means in said one end of the housing for recirculating lubricant that may pass along the shaft and out from beneath the bearing element adjacent thereto back into the secondary reservoir of the bearing element, and seal means mounted within said one end of the housing outwardly of the recirculating means adjament thereto to prevent foreign matter from passing along the shaft into the bearing, said seal means comprising an axially compressible resilient ring fixed within one said end of the housing, a first bearing ring engaging the inner end of said resilient ring in a manner to prevent rotation therebetween and a second bearing ring adapted to be fixed for rotation with the shaft and slidably engaging the exposed face of said first bearing ring to provide a rotary seal therebetween.

7. A package bearing comprising a shaft, a pair of axially spaced bearing elements on said shaft, each of said bearing elements being adapted to support radial loads imposed thereon by the shaft, a thin walled tubular housing extending over said bearing elements and cooperating therewith to define a main lubricant reservoir surrounding the shaft between the elements, secondary reservoir means in each of said bearing elements communicating with said main reservoir, said bearing elements being pervious to the flow of lubricant to transmit lubricant from said secondary reservoirs to the surface of the portion of the shaft supported thereby, seal means mounted within one end of said housing outwardly of said bearing elements and slidably sealing against a surface rotatable with the shaft to prevent foreign matter from passing along the shaft into the bearing, means adjacent to the other end of said bearing outwardly of the bearing elements for recirculating lubricant that may pass along the shaft and out from beneath the bearing element adjacent thereto back into the secondary reservoir of the adjacent bearing element, and a lubricant-impregnated wicking material filling said main reservoir and said secondary reservoirs.

8. The invention as defined in claim 7 wherein said seal means comprises a ring fixed within said one end of the housing and having a radially inwardly extending lip adapted to resiliently seal against the shaft.

9. The invention as defined in claim 7 including thrust means for fixing the shaft against axial movement relative to said bearing elements.

References Cited in the file of this patent

UNITED STATES PATENTS

| | | |
|---|---|---|
| 2,035,519 | Apple | Mar. 31, 1936 |
| 2,365,552 | Hill | Dec. 19, 1944 |
| 2,382,245 | McCormack | Aug. 14, 1945 |
| 2,704,232 | Johnston et al. | Mar. 15, 1955 |
| 2,761,747 | Abel | Sept. 4, 1956 |
| 2,823,966 | Reynolds | Feb. 18, 1958 |
| 2,964,363 | Daykin et al. | Dec. 13, 1960 |